(12) United States Patent
Hu et al.

(10) Patent No.: US 10,778,092 B2
(45) Date of Patent: Sep. 15, 2020

(54) NEGATIVE VOLTAGE GENERATING CIRCUIT HAVING AUTOMATIC VOLTAGE ADJUSTMENT FUNCTION

(71) Applicant: NO. 24 RESEARCH INSTITUTE OF CHINA ELECTRONICS TECHNOLOGY GROUP CORPORATION, Chongqing (CN)

(72) Inventors: Rongbin Hu, Chongqing (CN); Yonglu Wang, Chongqing (CN); Zhengping Zhang, Chongqing (CN); Jian'an Wang, Chongqing (CN); Guangbing Chen, Chongqing (CN); Dongbing Fu, Chongqing (CN); Yuxin Wang, Chongqing (CN); Hequan Jiang, Chongqing (CN); Gangyi Hu, Chongqing (CN)

(73) Assignee: NO.24 RESEARCH INSTITUTE OF CHINA ELECTRONICS TECHNOLOGY GROUP CORPORATION, Chongqing (CN)

( * ) Notice: Subject to any disclaimer, the term of this patent is extended or adjusted under 35 U.S.C. 154(b) by 0 days.

(21) Appl. No.: 16/605,804

(22) PCT Filed: Sep. 11, 2017

(86) PCT No.: PCT/CN2017/101217
§ 371 (c)(1),
(2) Date: Oct. 17, 2019

(87) PCT Pub. No.: WO2018/192158
PCT Pub. Date: Oct. 25, 2018

(65) Prior Publication Data
US 2020/0127559 A1     Apr. 23, 2020

(30) Foreign Application Priority Data

Apr. 19, 2017   (CN) .......................... 2017 1 0256148

(51) Int. Cl.
*G05F 3/02* (2006.01)
*H02M 3/07* (2006.01)

(52) U.S. Cl.
CPC ........ *H02M 3/07* (2013.01); *H02M 2003/071* (2013.01)

(58) Field of Classification Search
CPC .. H02M 3/07; H02M 3/073; H02M 2003/071; G05F 3/205; G05F 3/242;
(Continued)

(56) References Cited

U.S. PATENT DOCUMENTS

9,639,133 B2* 5/2017 Shor ......................... G05F 3/30
2006/0132237 A1 6/2006 Zochios
(Continued)

*Primary Examiner* — Long Nguyen (57) ABSTRACT

The present disclosure provides a negative voltage generating circuit having an automatic voltage adjustment function, including a negative voltage generating circuit and a feedback control module. The negative voltage generated by the negative voltage generating circuit is adjusted by the feedback control module. The negative voltage generating circuit having the automatic voltage adjustment function of the present disclosure can automatically adjust the charge current of the charge pump according to the load current, thereby realizing the stability of the output voltage, such that the traditional analog circuit structure can work normally under the extremely low power supply voltage, and is particularly suitable for the deep submicron process. The present disclosure also realizes the digital adjustment of the output voltage, the negative voltage output is no longer single, and can be adjusted according to actual needs.

8 Claims, 4 Drawing Sheets

(58) Field of Classification Search
CPC .......... G05F 3/262; G05F 3/265; G05F 1/465; G11C 5/145; H03K 2217/0018; H03K 19/0016
See application file for complete search history.

(56) References Cited

U.S. PATENT DOCUMENTS

2014/0167839 A1\* 6/2014 Kwon ..................... G05F 1/613
327/543
2014/0320097 A1\* 10/2014 Kwon ..................... G05F 1/613
323/280

\* cited by examiner

NEGATIVE VOLTAGE GENERATING CIRCUIT HAVING AUTOMATIC VOLTAGE ADJUSTMENT FUNCTION

CROSS REFERENCE TO RELATED APPLICATION

This is a Sect. 371 National Stage of PCT International Application No. PCT/CN2017/101217, filed on 11 Sep. 2017, which claims priority of a Chinese Patent Application No. 2017102561485 filed on 19 Apr. 2017, the contents of both applications hereby being incorporated by reference in their entireties for all purposes.

BACKGROUND

Field of Disclosure

The present disclosure relates to the field of integrated circuits, and in particular, to a negative voltage generating circuit having an automatic voltage adjustment function.

Description of Related Arts

In the field of integrated circuits, 0.35-0.8 µm and below are generally referred to as submicron scale, 0.25 µm and below are referred to as deep submicron, and 0.05 µm and below are referred to as nanoscale. At present, the mainstream production process technology of the integrated circuits is 0.010 µm-0.028 µm. With the CMOS process feature size developing towards deep submicron (below 90 nm), the chip supply voltage is getting lower, even below 1V. At such low power supply voltages, traditional analog circuit structures (such as operational amplifier, current source) will not function properly.

In order to make the traditional analog circuit structures work under the extremely low power supply voltage, a negative voltage is used in the integrated circuits. However, usually the CMOS chips are powered by a positive power supply voltage, therefore a negative voltage needs to be generated inside the chips. A variety of negative voltage generating circuits have also been studied successively. However, traditional negative voltage generating circuits still have big problems, for example only the negative voltage with a single level can be generated, and the generated negative voltage is susceptible to changes in load current, and has large fluctuation, which does not provide a stable output voltage. Therefore, a new technical means is needed to overcome the above technical problems.

SUMMARY OF THE PRESENT DISCLOSURE

The present disclosure provides a negative voltage generating circuit having an automatic voltage adjustment function, including: a negative voltage generating circuit, generating a negative voltage; and a feedback control module.

The feedback control module configures to adjust a negative voltage generated by the negative voltage generating circuit.

The negative voltage generating circuit includes at least: a first PMOS transistor, a second PMOS transistor, a third PMOS transistor, a seventh PMOS transistor, an eighth PMOS transistor, a third NMOS transistor, a fourth NMOS transistor, a sixth NMOS transistor, a seventh NMOS transistor, a first capacitor, a second capacitor, a third capacitor, a first inverter, and a second inverter.

A gate of the first PMOS transistor is connected with a source of the second PMOS transistor, a gate of the second PMOS transistor is connected with a source of the first PMOS transistor, a drain of the first PMOS transistor and a drain of the second PMOS transistor are respectively grounded, and a substrate of the first PMOS transistor and a substrate of the second PMOS transistor are respectively connected with a power supply.

A gate of the third NMOS transistor is connected with a source of the fourth NMOS transistor, the gate of the fourth NMOS transistor is connected with a source of the third NMOS transistor, a drain of the third NMOS transistor, a drain of the fourth NMOS transistor, a substrate of the third NMOS transistor, and a substrate of the fourth NMOS transistor are connected with each other and connected with the third capacitor.

A lower plate of the first capacitor is respectively connected with the source of the first PMOS transistor and a source of the third NMOS transistor, a lower plate of the second capacitor is respectively connected with the source of the second PMOS transistor and the source of the fourth NMOS transistor, an upper plate of the first capacitor is respectively connected with a drain of the sixth NMOS transistor and a drain of the seventh PMOS transistor, and an upper plate of the second capacitor is respectively connected with a drain of the seventh NMOS transistor and a drain of the eighth PMOS transistor.

A gate of the sixth NMOS transistor is connected with a gate of the seventh PMOS transistor, a connection point thereof is connected with an output end of the second inverter, a gate of the seventh NMOS transistor is connected with a gate of the eighth PMOS transistor, a connection point thereof is connected with an output end of the first inverter, a source and a substrate of the sixth NMOS transistor are grounded, a source and a substrate of the seventh NMOS transistor are grounded, a source of the seventh PMOS transistor and a source of the eighth PMOS transistor are respectively connected with a drain of the third PMOS transistor, a substrate of the seventh PMOS transistor is connected with the power supply, a substrate of the eighth PMOS transistor is connected with the power supply, a source and a substrate of the third PMOS transistor are connected with the power supply, and the output end of the first inverter is connected with an input end of the second inverter.

Further, the feedback control module includes: a first resistor, a first NMOS transistor, a second NMOS transistor, a fifth NMOS transistor, a fourth PMOS transistor, a fifth PMOS transistor, a sixth PMOS transistor, and a current source.

A gate of the first NMOS transistor is connected with a gate of the second NMOS transistor, a source of the first NMOS transistor, a source of the second NMOS transistor, a substrate of the first NMOS transistor, and a substrate of the second NMOS transistor are respectively grounded, the gate and a drain of the second NMOS transistor are connected with each other, a connection point thereof is connected with one end of a current source, and the other end of the current source is connected with the power supply.

A gate and a drain of the fourth PMOS transistor are connected with each other, and a connection point thereof is connected with a gate of the fifth PMOS transistor, a source of the fourth PMOS transistor, a source of the fifth PMOS transistor, a substrate of the fourth PMOS transistor, and a substrate of the fifth PMOS transistor are respectively grounded, a drain of the fifth PMOS transistor is connected with a drain of the first NMOS transistor, and a connection point thereof is connected with a gate of the third PMOS transistor.

The drain of the fourth PMOS transistor is connected with a source of the sixth PMOS transistor, a drain of the sixth PMOS transistor is connected with a drain of the fifth NMOS transistor, a gate of the sixth PMOS transistor is connected with a gate of the fifth NMOS transistor, a source and a substrate of the fifth NMOS transistor are connected with each other, a connection point thereof is connected with one end of the first resistor, and the other end of the first resistor is respectively connected with an output end and the third capacitor of the negative voltage generating circuit.

Further, a voltage of the output end is obtained by the following formula:

$$V_D = -V_{GSN5} - I_u R = -\sqrt{\frac{I_u}{K_{N5}}} - V_{THN}$$

$V_D$ is a voltage at an output end D, $V_{GSN5}$ is a voltage between the gate and source of the fifth NMOS transistor, $K_{N5}$ is a constant, $V_{THN}$ is a threshold voltage, $I_u$ is a current of the current source, and R is a resistance value the first resistor.

Further, the third NMOS transistor and the fourth NMOS transistor are deepwell transistors.

Further, the first resistor serves as a resistance value adjustable resistor.

Further, when the voltage at the output end is higher than $V_D$, a current flowing through the resistor R decreases, a current flowing through the fourth PMOS transistor decreases, a gate voltage of the fourth PMOS transistor rises, causing a current of the fifth PMOS transistor to decrease and be less than a current of the first NMOS transistor, a gate voltage of the third PMOS transistor then decreases, and a current of the third PMOS transistor increases, causing the voltage at the output end to fall until it returns to $V_D$.

Further, when the voltage at the output end is lower than $V_D$, a current flowing through the resistor R increases, a current flowing through the fourth PMOS transistor increases, a gate voltage of the fourth PMOS transistor falls, causing a current of the fifth PMOS transistor to increase and be greater than a current of the first NMOS transistor, a gate voltage of the third PMOS transistor then increases, and a current of the third PMOS transistor decreases, causing the voltage at the output end to rise until it returns to $V_D$.

Further, the negative voltage generating circuit and the feedback control module are integrated on the same chip to cooperate with each other, and form a whole.

The negative voltage generating circuit having the automatic voltage adjustment function of the present disclosure can automatically adjust the charge current of the charge pump according to the load current, thereby realizing the stability of the output voltage, such that the traditional analog circuit structure can also work normally under the extremely low power supply voltage, and is particularly suitable for the deep submicron process. The present disclosure also realizes the digital adjustment of the output voltage, the negative voltage output is no longer single, and can adjusted according to actual needs.

DETAILED DESCRIPTION OF THE PREFERRED EMBODIMENTS

The implementation mode of the present disclosure will be described below through specific embodiments. Those skilled in the art can easily understand other advantages and effects of the present disclosure according to contents disclosed by the specification. The present disclosure can also be implemented or applied through other different specific implementation modes. Various modifications or changes can also be made to all details in the specification based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated.

Figure 1:
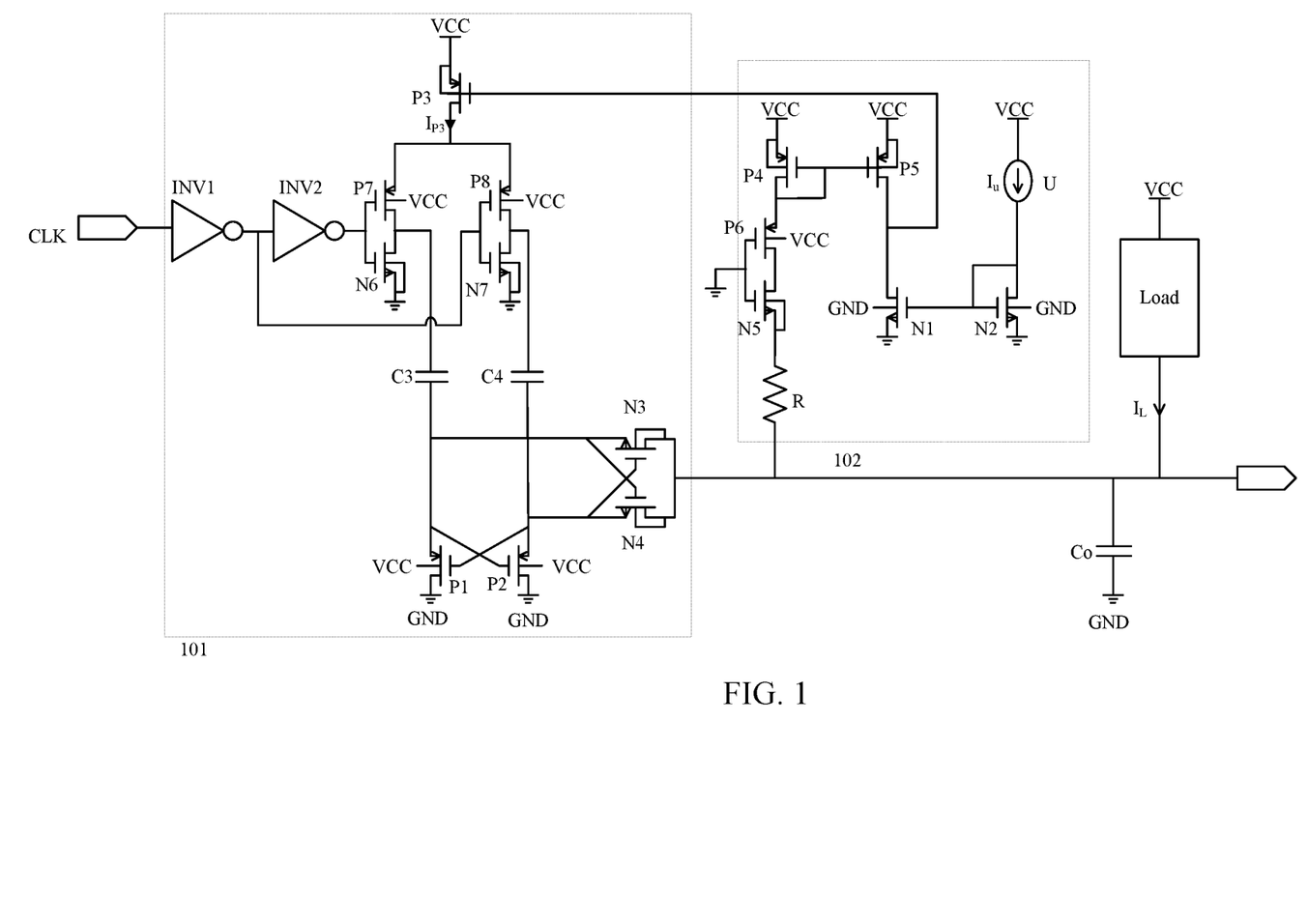
FIG. 1 illustrates a schematic diagram of a negative voltage generating circuit having an automatic voltage adjustment function according to an embodiment of the present disclosure.

As shown in FIG. 1, the negative voltage generating circuit having an automatic voltage adjustment function of the present embodiment includes: a negative voltage generating circuit, generating a negative voltage; and a feedback control module.

The feedback control module configures to adjust the negative voltage generated by the negative voltage generating circuit.

The negative voltage generating circuit 101 includes at least: a first PMOS transistor P1, a second PMOS transistor P2, a third PMOS transistor P3, a seventh PMOS transistor P7, an eighth PMOS transistor P8, a third NMOS transistor N3, a fourth NMOS transistor N4, a sixth NMOS transistor N6, a seventh NMOS transistor N7, a first capacitor C3, a second capacitor C4, a third capacitor C0, a first inverter INV1, and a second inverter INV2.

In this embodiment, the first PMOS transistor P1 and the second PMOS transistor P2 are cross-coupled. A gate of the first PMOS transistor P1 is connected with a source of the second PMOS transistor P2, a gate of the second PMOS transistor P2 is connected with a source of the first PMOS transistor P1, a drain of the first PMOS transistor P1 and a drain of the second PMOS transistor P2 are respectively grounded, and a substrate of the first PMOS transistor P1 and a substrate of the second PMOS transistor P2 are respectively connected with a power supply VCC.

The third NMOS transistor N3 and the fourth NMOS transistor N4 are cross-coupled deepwell NMOS transistors. A gate of the third NMOS transistor N3 is connected with a source of the fourth NMOS transistor N4, the gate of the fourth NMOS transistor N4 is connected with a source of a third NMOS transistor N3, a drain of the third NMOS transistor N3, a drain of the fourth NMOS transistor N4, a substrate of the third NMOS transistor N3, and a substrate of the fourth NMOS transistor N4 are connected with each other to serve as an output end D and are connected with the third capacitor C0.

A lower plate of the first capacitor is respectively connected with the source of the first PMOS transistor P1 and a source of the third NMOS transistor N3. A lower plate of the second capacitor C4 is respectively connected with the source of the second PMOS transistor P2 and the source of the fourth NMOS transistor N4. An upper plate of the first capacitor C3 is respectively connected with a drain of the sixth NMOS transistor N6 and a drain of the seventh PMOS transistor N7. An upper plate of the second capacitor C4 is respectively connected with a drain of the seventh NMOS transistor N7 and a drain of the eighth PMOS P8.

A gate of the sixth NMOS transistor N6 is connected with a gate of the seventh PMOS transistor N7, a connection point thereof is connected with an output end of the second inverter INV2. A gate of the seventh NMOS transistor N7 is connected with a gate of the eighth PMOS transistor P8, a connection point thereof is connected with an output end of the first inverter INV1. A source and a substrate of the sixth NMOS transistor N6 are grounded, a source and a substrate of the seventh NMOS transistor N7 are grounded. A source of the seventh PMOS transistor P7 and a source of the eighth PMOS transistor P8 are respectively connected with a drain of the third PMOS transistor P3. A substrate of the seventh PMOS transistor P7 is connected with the power supply, a substrate of the eighth PMOS transistor P8 is connected with the power supply, a source and a substrate of the third PMOS transistor P3 are connected with the power supply. The output end of the first inverter INV1 is connected with an input end of the second inverter INV2.

In this embodiment, it is assumed that the clock CLK is at a low level at the initial time, the output of the first inverter INV1 is at a high level, the PMOS transistor P8 is turned off, the seventh NMOS transistor N7 is turned on, and the upper plate of the second capacitor C4 is connected to the ground GND through the seventh NOMS transistor N7. The output of the second inverter INV2 is at a low level, the sixth NMOS transistor N6 is turned off, the seventh PMOS transistor P7 is turned on, and the third PMOS transistor P3 charges the first capacitor C3 through the seventh PMOS transistor P7. As the charging progresses, the potential of the upper plate of the capacitor keeps rising. It is assumed that the lower plates of the first capacitor C3 and the second capacitor C4 are both at a level of zero at the initial time.

After half a clock cycle, the clock signal CLK converts from a low level to a high level, the output of the first inverter INV1 converts from a high level to a low level, the seventh NMOS transistor N7 is turned off, and the eighth PMOS transistor P8 is turned on. The third PMOS transistor P3 charges the second capacitor C4 through the eighth PMOS transistor P8, and as the charging progresses, the potential of the upper plate of the capacitor keeps rising The output of the second inverter INV2 converts from a low level to a high level, the seventh PMOS transistor P7 is turned off, the sixth NMOS transistor N6 is turned on, and the upper plate of the first capacitor C3 is connected to the ground GND through the sixth NMOS transistor N6.

Due to the charge/voltage holding function of the capacitor, the lower plate of the first capacitor C3 will be pushed to a certain negative potential. Since the lower plate of the first capacitor C3 is at a negative potential, the second PMOS transistor P2 is turned on, the lower plate of the second capacitor C4 is connected to the ground through the second PMOS transistor P2, and the first PMOS transistor P1 is turned off. Since the lower plate of the first capacitor C3 is at a negative potential, the lower plate of the second capacitor C4 is at 0 potential, the fourth NMOS transistor N4 is turned off, the third NMOS transistor N3 is turned on, the negative charge in the lower plate of the first capacitor C3 is transferred to the third capacitor C0 through the third NMOS transistor N3, and the voltage at the output end D is pulled down.

After half another clock cycle, the clock signal CLK converts from a high level to a low level, the output of the first inverter INV1 converts from a low level to a high level, and the output of the second inverter INV2 converts from a high level to a low level. The NMOS transistor N7 is turned on, the eighth PMOS transistor P8 is turned off, the sixth NMOS transistor N6 is turned off, and the seventh PMOS transistor P7 is turned on. The upper plate of the second capacitor C4 is connected to the ground through the seventh NMOS transistor N7, and the third PMOS transistor P3 charges the first capacitor C3 through the seventh PMOS transistor P7.

Due to the charge/voltage holding function of the capacitor, the lower plate of the second capacitor C4 will be pushed to a negative potential, the first PMOS transistor P1 is turned on, the lower plate of the first capacitor C3 is connected to the ground through the first PMOS transistor P1, and the second PMOS transistor P2 is turned off. The lower plate of the second capacitor C4 is at a negative potential, the lower plate of the first capacitor C3 is at 0 potential, the fourth NMOS transistor N4 is turned on, the third NMOS transistor N3 is turned off, the negative charge in the lower plate of the second capacitor C4 is transferred to the third capacitor C0, and the potential at the output end D is pulled down.

Driven by the clock signal CLK cycle, the first capacitor C3 and the second capacitor C4 alternately charges the third capacitor C0. In the case that the output end is not connected with the LOAD, the voltage at the output end D will be pulled to −VCC. The source and the drain of the third NMOS transistor N3 and the source and the drain of the fourth NMOS transistor N4 are all at a negative potential. To achieve isolation, N3 and N4 are deep well transistors and respectively connect the substrate to the drain.

When the output end is connected with the LOAD, the load current IL will supply a positive charge to the large capacitor C0 and neutralizes the negative charge, which is transferred to the capacitor C0 from the first capacitor C3 and the second capacitor C4, thereby causing the voltage at the output end D to rise. The effect of combining the two factors is: when the average positive charge provided by the load current IL is greater than the average negative charge provided by the first capacitor C3 and the second capacitor C4, the voltage at the output end rises. When the average positive charge provided by the load current IL is less than the average negative charge provided by the first capacitor C3 and the second capacitor C4, the voltage at the output end drops. When the average positive charge provided by the load current IL is equal to the average negative charge provided by the first capacitor C3 and the second capacitor C4, the voltage at the output end remains unchanged. The average negative charge provided by the first capacitor C3 and the second capacitor C4 is equal to the current provided by the third PMOS transistor P3. The current provided by the third PMOS transistor P3 is controlled by a feedback mechanism 102.

In the present embodiment, the feedback control module includes: a first resistor R, a first NMOS transistor N1, a second NMOS transistor N2, a fifth NMOS transistor N5, a fourth PMOS transistor P4, a fifth PMOS transistor P5, a sixth PMOS transistor P6, and a current source U.

A gate of the first NMOS transistor N1 is connected with a gate of the second NMOS transistor N2. A source of the first NMOS transistor N1, a source of the second NMOS transistor N2, a substrate of the first NMOS transistor N1, and a substrate of the second NMOS transistor N2 are respectively grounded. The gate and a drain of the second NMOS transistor N2 are connected with each other, a connection point thereof is connected with one end of a current source U. The other end of the current source U is connected with the power supply.

A gate and a drain of the fourth PMOS transistor P4 are connected with each other, and a connection point thereof is connected with a gate of the fifth PMOS transistor P5. A source of the fourth PMOS transistor N4, a source of the fifth PMOS transistor P5, a substrate of the fourth PMOS transistor P4, and a substrate of the fifth PMOS transistor P5 are respectively grounded. A drain of the fifth PMOS transistor P5 is connected with a drain of the first NMOS transistor N1, and a connection point thereof is connected with a gate of the third PMOS transistor P3.

The drain of the fourth PMOS transistor P4 is connected with a source of the sixth PMOS transistor P6. A drain of the sixth PMOS transistor P6 is connected with a drain of the fifth NMOS transistor N5. A gate of the sixth PMOS transistor P6 is connected with a gate of the fifth NMOS transistor N5. A source and a substrate of the fifth NMOS transistor N5 are connected with each other, a connection point thereof is connected with one end of the first resistor R. The other end of the first resistor R is respectively connected with an output end and the third capacitor C0 of the negative voltage generating circuit.

In this embodiment, the first NMOS transistor N1 and the second NMOS transistor N2 constitute a current mirror. The current mirror mirrors the current $I_u$ of the power supply U to the first NMOS transistor N1. The fourth PMOS transistor P4 and the fifth PMOS transistor P5 constitute another current mirror. When the current supplied by the fifth PMOS transistor P5 is greater than the current supplied by the first NMOS transistor the gate potential of the third PMOS transistor P3 is increased, and the current supplied by the third PMOS transistor P3 is decreased. When the current supplied by the fifth PMOS transistor P5 is smaller than the current supplied from the first NMOS transistor N1, the gate potential of the third PMOS transistor P3 is pulled down, and the current supplied by the third PMOS transistor P3 is increased. The source and the substrate of the fifth NMOS transistor N5 are connected together and then connected with one end of the resistor R. The other end of the resistor R is connected with the output end D and the third capacitor C0. The third capacitor C0 in this embodiment is a large capacitor.

When the entire feedback control system is balanced, the current supplied by the third PMOS transistor P3 is equal to the load current IL. At this time, the gate source voltage of the third PMOS transistor P3 is as follows.

$$|V_{GSP3}| = \sqrt{\frac{I_L}{K_{P3}}} + |V_{TH}| \quad (1)$$

In the above formula, $K_{P3}$ is a constant related to the gate width to length ratio of the third PMOS transistor P3, and $V_{THP}$ is the threshold voltage of the third PMOS transistor P3. Therefore, the fifth PMOS transistor P5 and the first NMOS transistor N1 are both in the saturation working region, and the currents flowing through them are equal. Due to the action of the current mirror, the current flowing through the fourth PMOS transistor P4 is also equal to I u. Therefore the voltage at the output end D is as follows.

$$V_D = -V_{GSN5} - I_u R = -\sqrt{\frac{I_u}{K_{N5}}} - V_{THN} \quad (2)$$

In the above formula, $V_{GSN5}$ is the voltage between the gate and the source of the fifth NMOS transistor N5, $K_{N5}$ is a constant related to the gate width to length ratio of the transistor N5, and $V_{THN}$ is the threshold voltage of the fifth NMOS transistor N5.

When the voltage at the output end is higher than formula (2), the current flowing through the resistor R will decrease, the current flowing through the fourth PMOS transistor P4 will also decrease, and the gate voltage of the fourth PMOS transistor P4 will rise, causing the current of the fifth PMOS transistor P5 to decrease. The current of the fifth PMOS transistor P5 is less than the current of N1, the gate voltage of the third PMOS transistor P3 is pulled down, and the current supplied by the third PMOS transistor P3 is increased, causing the voltage at the output end to fall until it returns to formula (2).

When the voltage at the output end is lower than formula (2), the current flowing through the resistor R will increase, the current flowing through the fourth PMOS transistor P4 will also increase, and the gate voltage of the fourth PMOS transistor P4 will drop, causing the current of the fifth PMOS transistor P5 to increase. The current of the fifth PMOS transistor P5 is greater than the current of N1, causing the gate voltage of the third PMOS transistor P3 to be pulled up, and the current supplied by the third PMOS transistor P3 is decreased, causing the voltage at the output end to rise until it returns to formula (2).

When the load current changes within a certain range, the present disclosure can automatically return to the equilibrium state, and the output voltage is still determined by the formula (2).

When no load occurs, the voltage at the output end will be very low, which is −VCC. The sixth PMOS transistor P6 is introduced to prevent the breakdown of the fifth NMOS transistor N5 caused by an excessive inter-electrode voltage difference during no-load operation. The source of the fifth NMOS transistor N5 is at a negative potential. In order to achieve isolation, the substrate is connected with the source.

Figure 2:
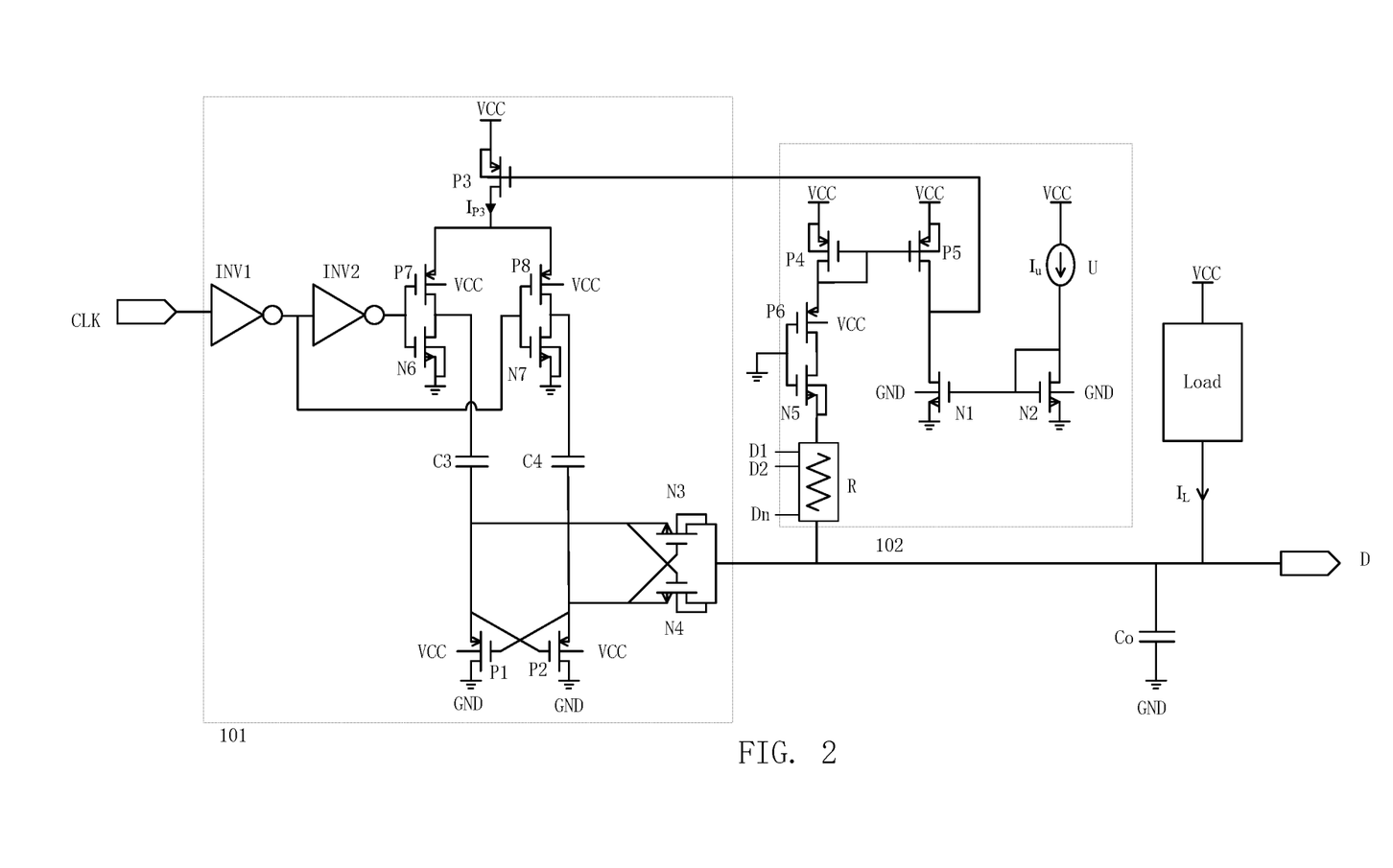
FIG. 2 illustrates a schematic diagram of a negative voltage generating circuit whose output voltage is digitally adjustable according to an embodiment of the present disclosure.
Figure 3:
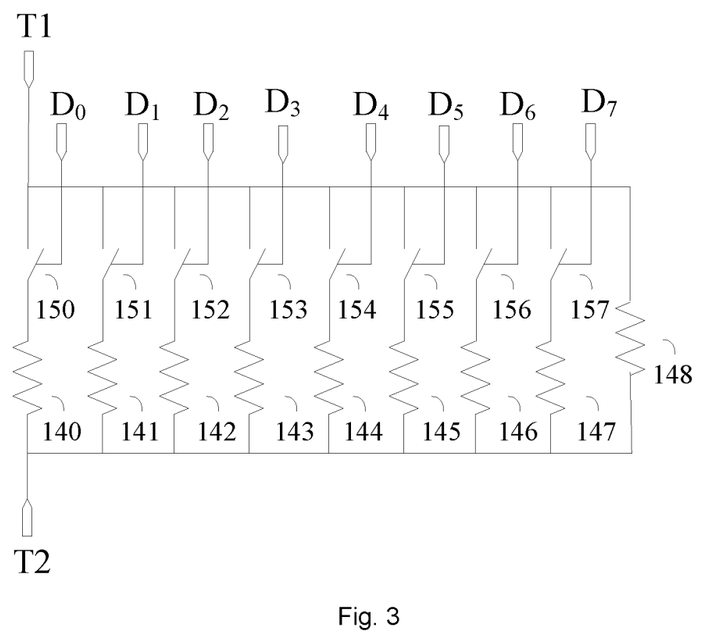
FIG. 3 illustrates a schematic diagram of a digital adjustable resistor according to an embodiment of the present disclosure.
Figure 4:
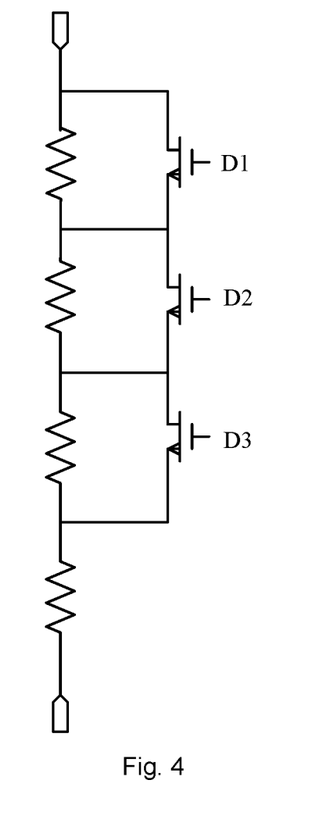
FIG. 4 illustrates a schematic diagram of a digital adjustable resistor according to another embodiment of the present disclosure.

It can be seen from formula (2) that the low output negative voltage can be changed by changing the resistance value of the resistor R. Therefore, the circuit structure shown in FIG. 2 not only provides a stable negative voltage, but also digitally adjusts the negative voltage. In this embodiment, the resistance value of the first resistor R is adjustable, and its structure is as shown in FIGS. 3, and 4. The switch in FIG. 3 can be a NMOS or PMOS transistor, other line type switching technique well known in the art can also be used. The output voltage is digitally adjustable through the adjustable resistor shown in FIGS. 3, and 4, and the negative voltage output is no longer single.

Preferably, the negative voltage generating circuit 101 and the feedback control mechanism 102 in this embodiment may be integrated on the same chip The third capacitor C0 is a large capacitor, which may be a 0.1 microfarad chip capacitor. The circuit may be accessed by means of connecting chip externally. The current source U may be implemented by the band gap benchmark technology, and the current of the current source may be 100 uA. Under the process condition of 0.18 um CMOS, the first NMOS transistor N1 and the second NMOS transistor N2 may be a transistor having a gate length of 1 um and a width to length ratio of 20/1. The fourth PMOS transistor P4 and the fifth PMOS transistor P5 may be a transistor having a gate length of 1 um and a width to length ratio of 20/1. The sixth PMOS transistor P6 may be a transistor having a gate length of 0.18 um and a width to length ratio of 20/1. The fifth NMOS transistor N5 may be a transistor having a gate length of 0.18 um and a width to length ratio of 20/1. The resistor R may be a polysilicon resistor with a high resistance value, and the resistance value may be 50K.

The third NMOS transistor N3 and the fourth NMOS transistor N4 in this embodiment are required to be a deep well transistor, having a gate length of 0.18 um and a width to length ratio of 20/1. The first PMOS transistor P1 and the second PMOS transistor P2 may be a transistor having a gate length of 0.18 um and a width to length ratio of 60/1. The capacitors C3 and C4 may be a Metal-Isolator-Metal (MIM) capacitor, and the capacitor value is around 3P. The seventh PMOS transistor P7 and the eighth PMOS transistor P8 may be a transistor having a gate length of 0.18 um and a width to length ratio of 60/1. The sixth NMOS transistor N6 and the seventh NMOS transistor N7 may be a transistor having a gate length of 0.18 um and a width to length ratio of 20/1. The first inverter INV1 and the second inverter INV2 adopt a CMOS static inverter structure. The transistor size is that: for the NMOS transistor, the gate length is 0.18 um, the width to length ratio is 20/1; for the PMOS transistor, the gate length is 0.18 um, and the width to length ratio is 60/1. The third PMOS transistor P3 may be selected according to the size of the load current. For a load current of 10 mA, 20 parallel transistors with a gate length of 0.18 um and a width to length ratio of 20/1 may be selected.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. A negative voltage generating circuit having an automatic voltage adjustment function, comprising:
   a negative voltage generating module to generate a negative voltage; and
   a feedback control module, connected with the negative voltage generating module to adjust the negative voltage generated by the negative voltage generating module; wherein
   the negative voltage generating module includes at least:
   a first PMOS transistor, a second PMOS transistor, a third PMOS transistor, a seventh PMOS transistor, an eighth PMOS transistor, a third NMOS transistor, a fourth NMOS transistor, a sixth NMOS transistor, a seventh NMOS transistor, a first capacitor, a second capacitor, a third capacitor, a first inverter, and a second inverter, wherein
   a gate of the first PMOS transistor is connected with a source of the second PMOS transistor,
   a gate of the second PMOS transistor is connected with a source of the first PMOS transistor,
   a drain of the first PMOS transistor and a drain of the second PMOS transistor are respectively grounded,
   a substrate of the first PMOS transistor and a substrate of the second PMOS transistor are respectively connected with a power supply,
   a gate of the third NMOS transistor is connected with a source of the fourth NMOS transistor,
   the gate of the fourth NMOS transistor is connected with a source of the third NMOS transistor,
   a drain of the third NMOS transistor, a drain of the fourth NMOS transistor, a substrate of the third NMOS transistor, and a substrate of the fourth NMOS transistor are connected with each other and connected with the third capacitor,
   a lower plate of the first capacitor is respectively connected with the source of the first PMOS transistor and a source of the third NMOS transistor,
   a lower plate of the second capacitor is respectively connected with the source of the second PMOS transistor and the source of the fourth NMOS transistor,
   an upper plate of the first capacitor is respectively connected with a drain of the sixth NMOS transistor and a drain of the seventh PMOS transistor,
   an upper plate of the second capacitor is respectively connected with a drain of the seventh NMOS transistor and a drain of the eighth PMOS transistor,
   a gate of the sixth NMOS transistor is connected with a gate of the seventh PMOS transistor, a connection point thereof is connected with an output end of the second inverter,
   a gate of the seventh NMOS transistor is connected with a gate of the eighth PMOS transistor, a connection point thereof is connected with an output end of the first inverter,
   a source and a substrate of the sixth NMOS transistor are grounded,
   a source and a substrate of the seventh NMOS transistor are grounded,
   a source of the seventh PMOS transistor and a source of the eighth PMOS transistor are respectively connected with a drain of the third PMOS transistor,
   a substrate of the seventh PMOS transistor is connected with the power supply,
   a substrate of the eighth PMOS transistor is connected with the power supply,
   a source and a substrate of the third PMOS transistor are connected with the power supply, and
   the output end of the first inverter is connected with an input end of the second inverter.

2. The negative voltage generating circuit having an automatic voltage adjustment function according to claim 1, wherein the feedback control module comprises:
   a first resistor, a first NMOS transistor, a second NMOS transistor, a fifth NMOS transistor, a fourth PMOS transistor, a fifth PMOS transistor, a sixth PMOS transistor, and a current source, wherein
   a gate of the first NMOS transistor is connected with a gate of the second NMOS transistor, a source of the first NMOS transistor, a source of the second NMOS transistor, a substrate of the first NMOS transistor, and a substrate of the second NMOS transistor are respectively grounded, the gate and a drain of the second NMOS transistor are connected with each other, a connection point thereof is connected with one end of athe current source, and the other end of the current source is connected with the power supply, a gate and a drain of the fourth PMOS transistor are connected with each other, and a connection point thereof is connected with a gate of the fifth PMOS transistor, a source of the fourth PMOS transistor, a source of the fifth PMOS transistor, a substrate of the fourth PMOS transistor, and a substrate of the fifth PMOS transistor are respectively grounded, a drain of the fifth PMOS transistor is connected with a drain of the first NMOS transistor, and a connection point thereof is connected with a gate of the third PMOS transistor, the drain of the fourth PMOS transistor is connected with a source of the sixth PMOS transistor, a drain of the sixth PMOS transistor is connected with a drain of the fifth NMOS transistor, a gate of the sixth PMOS transistor is connected with a gate of the fifth NMOS transistor, and a source and a substrate of the fifth NMOS transistor are connected with each other, a connection point thereof is connected with one end of the first resistor, and the other end of the first resistor is respectively connected with an output end and the third capacitor of the negative voltage generating module.

3. The negative voltage generating circuit having an automatic voltage adjustment function according to claim 2, wherein a voltage of the output end is obtained by the following formula:

$$V_D = -V_{GSN5} - I_u R = -\sqrt{\frac{I_u}{K_{N5}}} - V_{THN}$$

wherein $V_D$ is a voltage at an output end (D), $V_{GSN5}$ is a voltage between the gate and source of the fifth NMOS transistor, $K_{N5}$ is a constant, $V_{THN}$ is a threshold voltage, $I_u$ is a current of the current source, and R is a resistance value the first resistor.

4. The negative voltage generating circuit having an automatic voltage adjustment function according to claim 2, wherein the third NMOS transistor and the fourth NMOS transistor are deep well transistors.

5. The negative voltage generating circuit having an automatic voltage adjustment function according to claim 3, wherein the first resistor serves as a resistance value adjustable resistor to change the output negative voltage.

6. The negative voltage generating circuit having an automatic voltage adjustment function according to claim 3, wherein when the voltage at the output end is higher than $V_D$, a current flowing through the first resistor (R) decreases, a current flowing through the fourth PMOS transistor decreases, and a gate voltage of the fourth PMOS transistor rises, causing a current of the fifth PMOS transistor to decrease and be less than a current of the first NMOS transistor; and a gate voltage of the third PMOS transistor then decreases, and a current of the third PMOS transistor increases, causing the voltage at the output end to fall until it returns to $V_D$.

7. The negative voltage generating circuit having an automatic voltage adjustment function according to claim 3, wherein when the voltage at the output end is lower than $V_D$, a current flowing through the first resistor (R) increases, a current flowing through the fourth PMOS transistor increases, and a gate voltage of the fourth PMOS transistor falls, causing a current of the fifth PMOS transistor to increase and be greater than a current of the first NMOS transistor; and a gate voltage of the third PMOS transistor then increases, and a current of the third PMOS transistor decreases, causing the voltage at the output end to rise until it returns to $V_D$.

8. The negative voltage generating circuit having an automatic voltage adjustment function according to claim 1, wherein the negative voltage generating module and the feedback control module are integrated on a same chip.

* * * * *